June 30, 1964 M. W. HEWETT 3,139,539
CONTROL CIRCUIT PRODUCING OUTPUT SIGNAL SO LONG AS INPUT PULSES OCCUR WITHIN CERTAIN TIME INTERVAL
Filed March 30, 1962
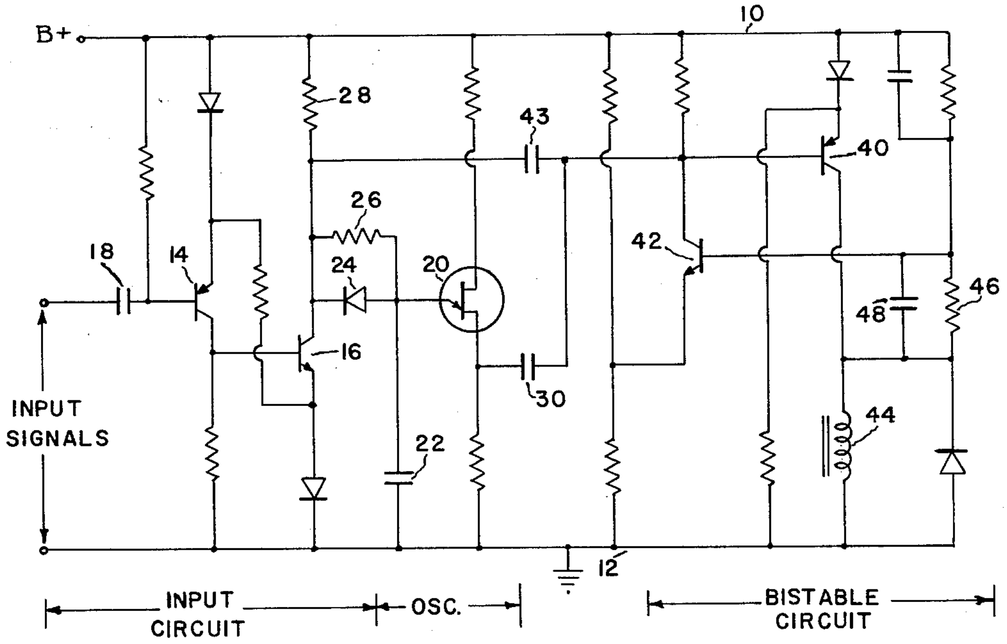
MAJOR W. HEWETT
BY James J. Williams
HIS ATTORNEY United States Patent Office 3,139,539
Patented June 30, 1964

3,139,539

CONTROL CIRCUIT PRODUCING OUTPUT SIGNAL SO LONG AS INPUT PULSES OCCUR WITHIN CERTAIN TIME INTERVAL

Major W. Hewett, Waynesboro, Va., assignor to General Electric Company, a corporation of New York
Filed Mar. 30, 1962, Ser. No. 183,796
3 Claims. (Cl. 307—88.5)

The invention relates to a control circuit, and particularly to a control circuit that produces continuous control signals in response to the presence or absence of discrete pulses or signals which recur within some maximum interval.

Certain indicator devices produce pulses or signals which recur at varying intervals between the pulses or signals. For example, railroad electronic hotbox detectors may utilize a wheel pickup device which produces a pulse or signal in response to each wheel of the cars of a passing train. Such a detector may be rendered operative in response to such pulses or signals. However, if the train is moving slowly, the pulses or signals may recur at appreciable intervals, particularly during the time between the passage of the front and rear wheels of a railroad car. Or, the train may stop so that no pulses or signals recur. During such appreciable intervals between pulses or signals, it is desirable, for various reasons, that portions of the hotbox detector be rendered inoperative.

Therefore, an object of the invention is to provide a novel control circuit which produces a continuous signal in response to discrete pulses or signals which recur within some maximum interval.

Another object of the invention is to provide a novel control circuit which produces a first continuous signal in response to the presence of discrete pulses or signals which recur within some maximum interval, and which produces a second continuous signal (or no signal) in response to the absence of discrete pulses or signals which recur within the maximum interval.

Briefly, these and other objects are achieved in accordance with the invention by a control circuit which includes an input circuit, an oscillator, and a bistable circuit. The recurring pulses or signals are applied to the input circuit. The oscillator is coupled to the input circuit, and the bistable circuit is coupled to both the input circuit and the oscillator. The oscillator is arranged to produce signals in the absence of input signals or in the absence of input signals which recur within some predetermined interval, and is further arranged to produce no signals in the presence of input signals which recur within the predetermined interval. The bistable circuit is arranged to produce a first continuous control signal in response to input signals, and is further arranged to produce a second continuous control signal (or no signal) in response to oscillator signals. Thus, any input pulse or signal tends to cause the bistable circuit to produce the first control signal, but if any such input pulse or signal fails to recur within a predetermined interval, the oscillator may produce signals which cause the bistable circuit to produce the second control signal.

The invention will be better understood from the following description in connection with the accompanying drawing, and its scope will be indicated in the claims. In the drawing:

The single figure shows a circuit diagram of a preferred embodiment of the invention.

The circuit diagram may be divided generally into three parts: an input circuit or amplifier, an oscillator, and a bistable circuit. The circuit is powered by a suitable source of unidirectional or direct current potential which is supplied by a supply bus 10, this source of potential B+ being positive with respect to a reference such as the reference bus 12. The reference bus 12 may be grounded if desired. The input circuit or amplifier includes first and second amplifier transistors 14, 16 which are respectively of the PNP and NPN type. Each of the transistors 14, 16 has an emitter, a base, and a collector. The first and second amplifier transistors 14, 16 are suitably coupled by resistors and diode rectifiers to each other and to the supply bus 10 and the reference bus 12. Input signals are applied through an input capacitor 18 to the base of the first amplifier transistor 14, and signals are derived from the first amplifier transistor 14 at its collector. These signals are applied directly to the base of the second amplifier transistor 16, and signals are derived from the second amplifier transistor 16 at its collector. It will be seen that negative signals applied to the base of the first amplifier transistor 14 cause corresponding and amplified negative-going signals at the collector of the second amplifier transistor 16. These signals at the collector of the second amplifier transistor 16 are applied to the oscillator and also to the bistable circuit.

The oscillator utilizes a unijunction transistor 20 which, as known in the art, includes an emitter and two bases. As also known, a unijunction transistor has a threshold characteristic which requires an appreciable magnitude of the emitter signal to provide base current, after which the magnitude of the emitter signal may be reduced to provide the same base current. The unijunction transistor 20 is provided with suitable potentials by the resistors coupled between its base electrodes and the buses 10, 12. A capacitor 22 is coupled between the emitter of the unijunction transistor 20 and the reference bus 12. The capacitor 22 is coupled by a diode rectifier 24 and a resistor 26 to the collector of the second amplifier transistor 16, and further by a resistor 28 to the supply bus 10. The oscillator circuit just described functions as a relaxation oscillator as is known to persons skilled in the art, and as follows: If the second amplifier transistor 16 is turned off, the capacitor 22 is charged (with its upper plate positive with respect to its lower plate) through the resistors 26, 28, the rate of this charge being determined by the magnitude of the supply potential and by the magnitude of these resistors 26, 28. When this charge reaches some predetermined magnitude, it causes base current to flow through the unijunction transistor 20. This base current is partially supplied from the emitter of the unijunction transistor 20 and thereby discharges the capacitor 22. Because of the characteristics of the unijunction transistor 20, this discharge is rapid and distinct. Also because of the characteristics of the unijunction transistor 20, the base current and the emitter current stop abruptly when the discharge reaches a certain level so that the capacitor 22 begins to receive a new charge through the resistors 26, 28. After receiving sufficient charge, the capacitor 22 is again discharge as just described. In this way, positive-going oscillating signals are provided and are coupled through a capacitor 30 to the bistable circuit. However, if the second amplifier transistor 16 is conducting, its collector is sufficiently negative to cause the diode 24 to conduct and keep the capacitor 22 discharged, and hence prevent the oscillator from producing signals.

The bistable circuit includes first and second transistors 40, 42 which are respectively of the PNP and NPN type. Each of the transistors 40, 42 has an emitter, a base, and a collector. The transistors 40, 42 are suitably coupled by resistors and a diode rectifier to each other and to the supply bus 10 and the reference bus 12. The base of the first transistor 40 is coupled to the collector of the second amplifier transistor 16 by a capacitor 43 and to the lower base of the unijunction transistor 20 by the capacitor 30. Signals for the bistable circuit are applied to the base of the first transistor 40, and the conduction or lack of conduction of this first transistor 40 provides the continuous control signals. In the embodiment illustrated, the continuous control signals are utilized by a relay winding 44 coupled in the collector circuit of the first transistor 40, this winding 44 having associated contacts (not shown) which perform whatever function is desired. The collector circuit of the first transistor 40 is regeneratively coupled through a resistor 46 and a capacitor 48 to the base of the second transistor 42. The collector of the second transistor 42 is coupled directly to the base of the first transistor 40. The second transistor 42 is coupled between the collector and the base of the first transistor 40 in such a fashion as to reinforce or augment any signal applied to the base of the first transistor 40. Thus, if a negative-going signal is applied to the base of the first transistor 40, its collector becomes more positive, thus causing the base of the second transistor 42 to become more positive. With the base of the second transistor 42 becoming more positive, its collector tends to become more negative and reinforces the negative-going signal originally applied to the base of the first transistor 40. The same reinforcement takes place for a positive-going signal.

The operation of the control circuit will be explained. For the circuit shown, the input signals or pulses are negative-going. In the absence of such pulses, the amplifier transistors 14, 16 are biased so that they are cut off or are conducting very little current. The potential on the collector of the second transistor 16 is sufficiently positive so that the diode 24 is reverse biased and cut off. The oscillator capacitor 22 receives a charge, and when this charge reaches a predetermined level, the unijunction transistor 20 fires or conducts. Upon firing of the transistor 20, a positive-going signal is applied through the capacitor 30 to the base of the first transistor 40 of the bistable circuit. This positive-going signal turns the first transistor 40 off or renders it nonconducting, and it is held in this state by circuit elements. Thus, no current flows through the relay winding 44 and a continuous control signal (indicated by the deenergized relay winding 44) is produced. In the absence of negative-going input pulses or signals applied to the circuit, the oscillator continues to produce the positive-going signals. However, when a negative-going pulse is received at the input of the circuit, a corresponding negative-going signal is produced at the collector of the second transistor 16 of the input circuit or amplifier. This negative-going signal is sufficient to cause the diode 24 to conduct and thus discharge the oscillator capacitor 22 through the second transistor 16. This negative-going signal is also coupled through the capacitor 43 to the base of the first transistor 40 of the bistable circuit. This causes the first transistor 40 to conduct and remain conducting because of the second transistor 42 so as to energize the relay winding 44. Thus a continuous control signal (indicated by energization of the relay winding 44) is produced in response to an input pulse or signal. Following such a signal, the capacitor 22 again begins to become charged. If another negative-going input pulse is received before the capacitor 22 is charged sufficiently to cause conduction of the unijunction transistor 26, the capacitor 22 will be discharged by conduction of the second transistor 16 and the diode 24 so that the oscillator does not produce a signal. Thus, the first transistor 40 of the bistable circuit remains in a conducting state and the relay winding 44 remains energized.

It will be seen that in order to keep the relay winding 44 energized, the input pulses or signals must recur before the oscillator capacitor 22 receives sufficient charge to cause the oscillator to produce a signal. The time required for the oscillator capacitor 22 to receive this charge is determined by the magnitude of the resistors 26, 28, among other things. Thus, these resistors 26, 28 may provide a variable adjustment of the interval within which input signals or pulses must recur in order to keep the relay winding 44 energized. Other elements of the circuit may also be used to change this interval. However, the resistors are relatively easy to change.

It will thus be seen that the invention provides a circuit for producing a continuous control signal in response to discrete pulses or signals which recur within some maximum time interval, and which produces a second control signal in response to the absence of such pulses or in the absence of such pulses within the predetermined interval. Persons skilled in the art will recognize that changes, such as the types of transistors and the relative polarities of various signals, may be readily made. While the invention has been described with reference to one particular embodiment, it is to be understood that modifications may be made without departing from the spirit of the invention or from the scope of the claims.

What I claim as new and desire to secure by Letters Patent of the United States is:

1. A circuit for producing a continuous control signal in response to input signals which recur within some interval comprising an input circuit, means for applying said input signals to said input circuit, an oscillator comprising a unijunction transistor and a capacitor coupled together so that said unijunction transistor conducts in response to a predetermined charge on said capacitor and discharges said capacitor, said oscillator producing signals in the absence of input signals applied thereto which recur within said interval and producing no signals in the presence of input signals applied thereto which recur within said interval, means coupling said input circuit to said oscillator for applying said input signals thereto, a bistable circuit having first and second transistors coupled together so that signals applied to said first transistor are reinforced by said second transistor, means coupling said oscillator to said bistable circuit for applying said oscillator signals thereto, and means coupling said input circuit to said bistable circuit for applying said input signals thereto, said bistable circuit assuming a first condition in response to said oscillator signals and assuming a second condition in response to said input signals, and said bistable circuit producing said continuous control signal in response to said second condition.

2. A circuit for producing a continuous control signal in response to discrete pulses which recur within some maximum interval comprising an amplifier having an input circuit and an output circuit, means for applying said pulses to said amplifier input circuit; a relaxation oscillator comprising a unijunction transistor and a capacitor coupled together so that said unijunction transistor conducts in response to a predetermined charge on said capacitor and discharges said capacitor to produce recurring oscillator signals at an output circuit; said oscillator being arranged to produce said oscillator signals in the absence of input signals applied thereto, to produce said oscillator signals in the absence of input signals applied thereto which recur within said maximum interval, and to produce no signals in the presence of input signals applied thereto which recur within said maximum interval; means coupling said amplifier output circuit to said oscillator for applying said pulses thereto; a bistable circuit having first and second transistors coupled together, said first transistor being provided with an input circuit and said second transistor being coupled to said first transistor to reinforce signals applied to said input circuit of said first transistor; means coupling said oscillator output circuit to said input circuit of said bistable circuit for applying said oscillator signals thereto; means coupling said output circuit of said amplifier to said input circuit of said bistable circuit for applying said pulses thereto; said first and second transistors of said bistable circuit assuming a first condition in response to said oscillator signal and assuming a second condition in response to said pulses; and means coupled to said first transistor of said bistable circuit for deriving said continuous control signal therefrom.

3. A circuit for producing a continuous control signal in response to discrete pulses which recur within some maximum interval comprising an amplifier having an input circuit and an output circuit; means for applying said pulses to said amplifier input circuit; a relaxation oscillator comprising a unijunction transistor and a capacitor coupled together so that said unijunction transistor conducts in response to a predetermined charge on said capacitor and discharges said capacitor to produce recurring first polarity oscillator signals at an output circuit by the charge and discharge of said capacitor; said oscillator being arranged to produce said first polarity oscillator signals in the absence of second polarity input signals applied thereto, to produce said first polarity oscillator signals in the absence of second polarity input signals applied thereto which recur within said maximum interval, and to produce no signals in the presence of second polarity input signals applied thereto which recur within said maximum interval; means coupling said amplifier output circuit to said oscillator capacitor for applying said second polarity signals thereto to discharge said capacitor; a bistable circuit having first and second transistors coupled together, said first transistor being provided with an input circuit and said second transistor being coupled to said first transistor to reinforce signals applied to said input circuit of said first transistor; means coupling said oscillator output circuit to said input circuit of said bistable circuit for applying said first polarity oscillator signals thereto; means coupling said output circuit of said amplifier to said input circuit of said bistable circuit for applying said second polarity signals thereto; said first and second transistors of said bistable circuit assuming a first condition in response to said first polarity oscillator signals and assuming a second condition in response to said second polarity amplifier signals; and means coupled to said first transistor of said bistable circuit for deriving said continuous control signal therefrom in response to said second condition.

References Cited in the file of this patent

UNITED STATES PATENTS

| | | |
|---|---|---|
| 3,018,384 | Zrubek | Jan. 23, 1962 |
| 3,033,994 | Fujimoto | May 8, 1962 |

OTHER REFERENCES

Electronics, "Subaudio Swept Signal Generator," by Rosen, April 22, 1960, pages 67, 68.

UNITED STATES PATENT OFFICE

CERTIFICATE OF CORRECTION

Patent No. 3,139,539 June 30, 1964

Major W. Hewett

It is hereby certified that error appears in the above numbered patent requiring correction and that the said Letters Patent should read as corrected below.

Column 1, line 70, after "potential" insert -- B+ --; column 2, line 1, strike out "B+"; line 55, for "discharge" read -- discharged --; column 4, line 74, for "signal" read -- signals --.

Signed and sealed this 5th day of January 1965.

(SEAL)
Attest:

ERNEST W. SWIDER
Attesting Officer

EDWARD J. BRENNER
Commissioner of Patents